US012356343B2

(12) United States Patent
Yuan et al.

(10) Patent No.: US 12,356,343 B2
(45) Date of Patent: Jul. 8, 2025

(54) BEAM-SPECIFIC DUTY CYCLE

(71) Applicant: QUALCOMM Incorporated, San Diego, CA (US)

(72) Inventors: Fang Yuan, Beijing (CN); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/759,428

(22) PCT Filed: Feb. 11, 2021

(86) PCT No.: PCT/US2021/017640
§ 371 (c)(1),
(2) Date: Jul. 25, 2022

(87) PCT Pub. No.: WO2021/163311
PCT Pub. Date: Aug. 19, 2021

(65) Prior Publication Data
US 2022/0377680 A1    Nov. 24, 2022

(51) Int. Cl.
*H04W 52/36* (2009.01)

(52) U.S. Cl.
CPC ....... *H04W 52/367* (2013.01); *H04W 52/365* (2013.01)

(58) Field of Classification Search
CPC .... H04B 7/0695; H04B 7/088; H04B 7/0617; H04B 7/063; H04B 7/0408; H04B 1/3838;

(Continued)

(56) References Cited

U.S. PATENT DOCUMENTS 10,291,309 B2    5/2019    Chakraborty et al.
10,412,685 B2    9/2019    Scipione et al.
(Continued)

FOREIGN PATENT DOCUMENTS

| CN | 108141275 A | 6/2018 |
| CN | 109964513   | 7/2019 |

(Continued)

OTHER PUBLICATIONS

Anonymous: "3rd Generation Partnership Project; Technical Specification Group Radio Access Network; NR; Medium Access Control (MAC) Protocol Specification (Release 15)", 3GPP Standard; Technical Specification; 3GPP TS 38 .321, 3rd Generation Partnership Project (3GPP), Mobile Competence Centre; 650, Route Des Lucioles; F-06921, Sophia-Antipolis Cedex; France, vol. RAN WG2, No. V15.7.0, Sep. 27, 2019 (Sep. 27, 2019), pp. 1-77, XP051785032, Retrieved from the Internet: URL: http://ftp.3gpp.org/Specs/archive/38_series/38.321/38321-f70.zip 38321-f70.docx [retrieved on Sep. 27, 2019] section 6.1. 3. 8, sections 6.1.3.9.

(Continued)

*Primary Examiner* — Golam Sorowar
(74) *Attorney, Agent, or Firm* — Harrity & Harrity, LLP

(57) ABSTRACT

Various aspects of the present disclosure generally relate to wireless communication. In some aspects, a user equipment (UE) may determine a maximum permissible exposure (MPE) condition for one or more transmit beams of the UE; and transmit, to a base station based at least in part on the MPE condition, information indicating one or more duty cycle values for the one or more transmit beams. Numerous other aspects are provided.

30 Claims, 12 Drawing Sheets

(58) Field of Classification Search
CPC .. H04B 7/0404; H04B 17/336; H04B 7/0634; H04B 7/0626; H04B 7/0639; H04B 17/309; H04B 17/318; H04B 7/0413; H04B 7/0691; H04B 7/0697; H04B 17/102; H04B 7/06966; H04B 7/2684; H04W 52/367; H04W 52/146; H04W 72/046; H04W 52/365; H04W 24/10; H04W 52/42; H04W 16/28; H04W 72/23; H04W 72/21; H04W 72/0473; H04W 52/242; H04W 76/28; H04W 52/028; H04W 72/0446; H04W 72/542; H04W 88/02; H04W 24/08; H04W 52/325; H04W 72/044

See application file for complete search history.

(56) References Cited

U.S. PATENT DOCUMENTS

| | | |
|---|---|---|
| 2018/0167897 A1 | 6/2018 | Sampath et al. |
| 2019/0387483 A1 | 12/2019 | Lee et al. |
| 2020/0021421 A1 | 1/2020 | Han et al. |
| 2020/0022093 A1 | 1/2020 | Han et al. |
| 2020/0112927 A1 | 4/2020 | Han et al. |
| 2022/0007299 A1* | 1/2022 | Rahman ............ H04W 52/367 |
| 2022/0116891 A1* | 4/2022 | Yao ............... H04W 52/42 |
| 2022/0256473 A1* | 8/2022 | Kiilerich Pratas .. H04W 52/367 |
| 2022/0264481 A1* | 8/2022 | Caporal Del Barrio ................ H04W 52/365 |
| 2023/0028505 A1* | 1/2023 | Okamura ............ H04W 8/24 |
| 2023/0043225 A1* | 2/2023 | Hong ............... H04W 52/365 |

FOREIGN PATENT DOCUMENTS

| | | |
|---|---|---|
| CN | 110431755 | 11/2019 |
| WO | WO-2017048602 | 3/2017 |
| WO | WO-2018111844 A1 | 6/2018 |
| WO | WO-2018175002 A1 | 9/2018 |

OTHER PUBLICATIONS

Intel Corporation: "Indication and Reporting Enhancements to Mitigate RLF", 3GPP Draft, 3GPP RAN4 WG Meeting #92Bis, R4-1913576, 3rd Generation Partnership Project (3GPP), Mobile Competence Centre; 650, Route Des Lucioles; F-06921, Sophia-Antipolis Cedex; France, vol. RAN WG4, No. Reno, USA; Nov. 18, 2019-Nov. 22, 2019, Nov. 8, 2019 (Nov. 8, 2019), XP051818149, 3 pages, Retrieved from the Internet: URL:https://ftp.3gpp.org/tsg_ran/WG4_Radio/TSGR4_93/Docs/R4-1913576.zip R4-1913576 -Indication and reporting enhancements to mitigate RLF.docx [retrieved on Nov. 8, 2019] section 2 section 2.1.

International Search Report and Written Opinion—PCT/CN2020/074786—ISA/EPO—Nov. 17, 2020.

International Search Report and Written Opinion—PCT/US2021/017640—ISA/EPO—May 14, 2021.

Nokia, et al., "Mitigating Radio Link Failures due to MPE on FR2", 3GPP Draft, 3GPP TSG-RAN WG4 Meeting #92, R4-1910278, Ljubljana, Slovenia, Aug. 26-30, 2019, Aug. 30, 2019 (Aug. 30, 2019), 5 Pages, Section 2.

Nokia, et al., "UE Beam Management Enhancements to Help in FR2 MPE Issues", 3GPP Draft, 3GPP TSG-RAN WG4 Meeting #92, R4-1908819, Ljubljana, Slovenia, Aug. 26-30, 2019, Aug. 30, 2019 (Aug. 30, 2019), 2 Pages, Section 2.

Qualcomm Incorporated: "Reporting Options Toward Network to Improve Link Reliability Under MPE Issue", 3GPP Draft, 3GPP TSG-RAN WG4 Meeting #92-Bis, R4-1910752, Chongqing, China, Oct. 14-18, 2019, Oct. 18, 2019 (Oct. 18, 2019), 3 Pages, Section 2.

Intel Corporation: "Beam Management Enhancements for MPE", 3GPP TSG RAN WG1 Meeting #99, R1-1912185, Reno, USA, Nov. 18-Nov. 22, 2019, 2 Pages.

Intel Corporation: "Indication and Reporting Enhancements to Mitigate RLF", 3GPP RAN4 Wg Meeting #92Bis, R4-1913576, Reno, USA, Nov. 18-22, 2019, 3 Pages.

Nokia, et al., "UE FR2 MPE Enhancements and Solutions", 3GPP TSG RAN WG4 Meeting #93, R4-1914274, 3rd Generation Partnership Project, Mobile Competence Centre, 650, Route Des Lucioles, F-06921 Sophia-Antipolis Cedex, France, vol. RAN WG4, No. Reno, USA, Nov. 18, 2019-Nov. 22, 2019, XP051818699, Nov. 22, 2019, Nov. 8, 2019, 7 Pages.

* cited by examiner

BEAM-SPECIFIC DUTY CYCLE

CROSS-REFERENCE TO RELATED APPLICATIONS

This Patent Application is a 371 national stage of PCT Application No. PCT/CN2021/017640 filed on Feb. 11, 2021, entitled "BEAM-SPECIFIC DUTY CYCLE," which claims priority to PCT Patent Application No. PCT/CN2020/074786, filed on Feb. 12, 2020, entitled "BEAM-SPECIFIC DUTY CYCLE," and assigned to the assignee hereof. The disclosure of the prior Applications are considered part of and is are incorporated by reference into this Patent Application.

FIELD OF THE DISCLOSURE

Aspects of the present disclosure generally relate to wireless communication and to techniques and apparatuses for a beam-specific duty cycle.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication, performed by a UE, may include determining a maximum permissible exposure (MPE) condition for one or more transmit beams of the UE; and transmitting, to a base station based at least in part on the MPE condition, information indicating one or more duty cycle values for the one or more transmit beams.

In some aspects, a method of wireless communication, performed by a base station, may include receiving, based at least in part on an MPE condition for one or more transmit beams of a UE, information indicating one or more duty cycle values for the one or more transmit beams; and communicating with the UE in accordance with the one or more duty cycle values.

In some aspects, a UE for wireless communication may include a memory and one or more processors operatively coupled to the memory. The memory and the one or more processors may be configured to determine an MPE condition for one or more transmit beams of the UE; and transmit, to a base station based at least in part on the MPE condition, information indicating one or more duty cycle values for the one or more transmit beams.

In some aspects, a base station for wireless communication may include a memory and one or more processors operatively coupled to the memory. The memory and the one or more processors may be configured to receive, based at least in part on an MPE condition for one or more transmit beams of a UE, information indicating one or more duty cycle values for the one or more transmit beams; and communicate with the UE in accordance with the one or more duty cycle values.

In some aspects, a non-transitory computer-readable medium may store one or more instructions for wireless communication. The one or more instructions, when executed by one or more processors of a UE, may cause the one or more processors to determine an MPE condition for one or more transmit beams of the UE; and transmit, to a base station based at least in part on the MPE condition, information indicating one or more duty cycle values for the one or more transmit beams.

In some aspects, a non-transitory computer-readable medium may store one or more instructions for wireless communication. The one or more instructions, when executed by one or more processors of a base station, may cause the one or more processors to receive, based at least in part on an MPE condition for one or more transmit beams of a UE, information indicating one or more duty cycle values for the one or more transmit beams; and communicate with the UE in accordance with the one or more duty cycle values.

In some aspects, an apparatus for wireless communication may include means for determining an MPE condition for one or more transmit beams of the apparatus; and means for transmitting, to a base station based at least in part on the MPE condition, information indicating one or more duty cycle values for the one or more transmit beams.

In some aspects, an apparatus for wireless communication may include means for receiving, based at least in part on an MPE condition for one or more transmit beams of a UE, information indicating one or more duty cycle values for the one or more transmit beams; and means for communicating with the UE in accordance with the one or more duty cycle values.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
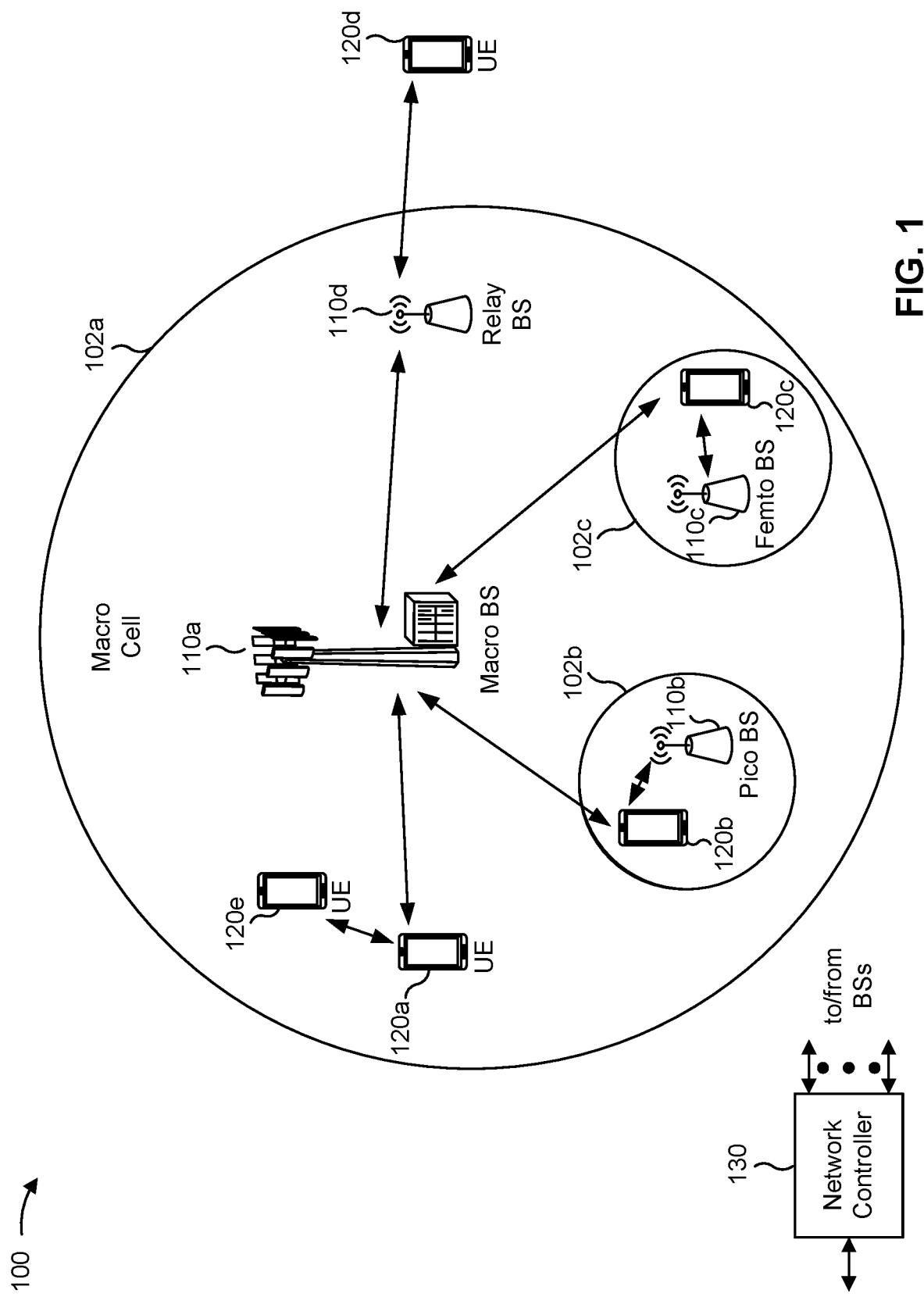
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
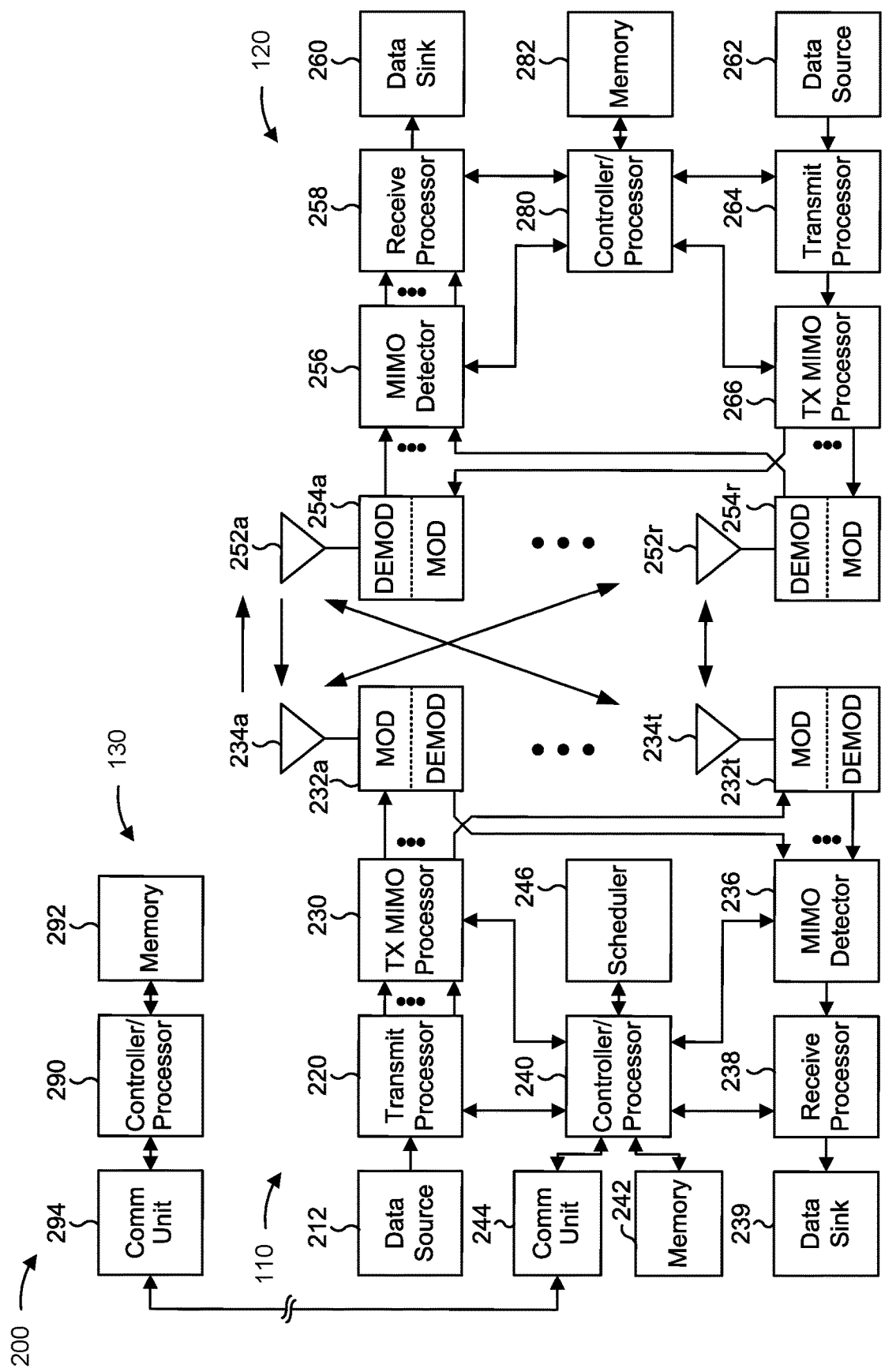
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with beam-specific duty cycle reporting, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
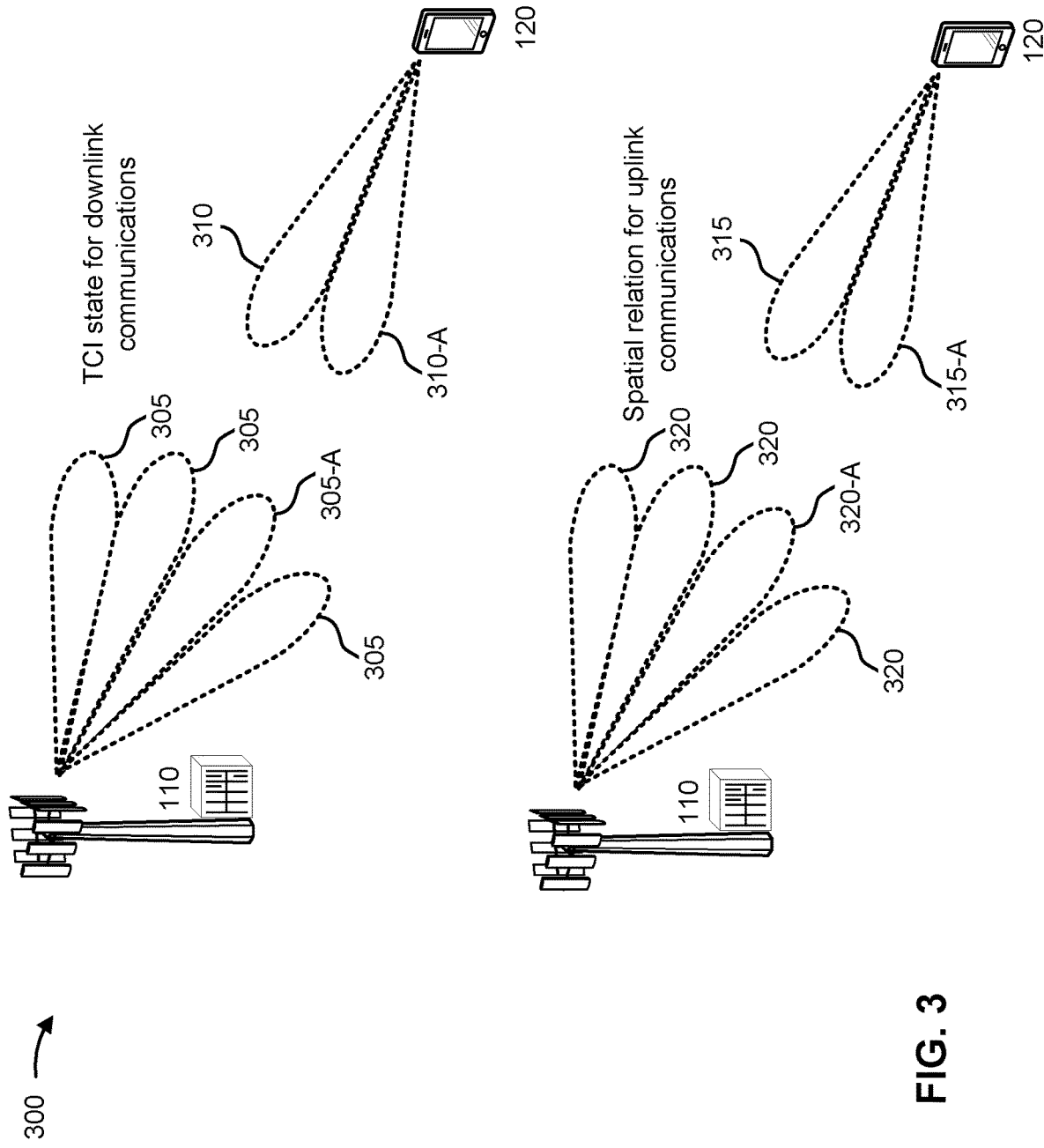
FIG. 3 is a diagram illustrating an example 300 of using beams for communications between a base station and a UE, in accordance with various aspects of the present disclosure.

FIG. 3 is a diagram illustrating an example 300 of using beams for communications between a base station and a UE, in accordance with various aspects of the present disclosure. As shown in FIG. 3, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 305.

The UE 120 may attempt to receive downlink transmissions via one or more UE receive beams 310, which may be configured using different beamforming parameters at receive circuitry of the UE 120. The UE 120 may identify a particular BS transmit beam 305, shown as BS transmit beam 305-A, and a particular UE receive beam 310, shown as UE receive beam 310-A, that provide relatively favorable performance (for example, that have a best channel quality of the different measured combinations of BS transmit beams 305 and UE receive beams 310). In some examples, the UE 120 may transmit an indication of which BS transmit beam 305 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 305-A and the UE receive beam 310-A), which may be further refined and maintained in accordance with one or more established beam refinement procedures.

A downlink beam, such as a BS transmit beam 305 or a UE receive beam 310, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 305 may be associated with a synchronization signal block (SSB), and the UE 120 may indicate a preferred BS transmit beam 305 by transmitting uplink transmissions in resources of the SSB that are associated with the preferred BS transmit beam 305. A particular SSB may have an associated TCI state (for example, for an antenna port or for beamforming). The base station 110 may, in some examples, indicate a downlink BS transmit beam 305 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 310 at the UE 120. Thus, the UE 120 may select a corresponding UE receive beam 310 from a set of BPLs based at least in part on the base station 110 indicating a BS transmit beam 305 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated uplink beam ID, beam direction, or beam symbols, among other examples. The UE 120 may transmit uplink communications via one or more UE transmit beams 315.

The base station 110 may receive uplink transmissions via one or more BS receive beams 320. The base station 110 may identify a particular UE transmit beam 315, shown as UE transmit beam 315-A, and a particular BS receive beam 320, shown as BS receive beam 320-A, that provide relatively favorable performance (for example, that have a best channel quality of the different measured combinations of UE transmit beams 315 and BS receive beams 320). In some examples, the base station 110 may transmit an indication of which UE transmit beam 315 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 315-A and the BS receive beam 320-A), which may be further refined and maintained in accordance with one or more established beam refinement procedures. An uplink beam, such as a UE transmit beam 315 or a BS receive beam 320, may be associated with a spatial relation. A spatial relation may indicate a directionality or a characteristic of the uplink beam, similar to one or more QCL properties, as described above.

As indicated above, FIG. 3 is provided as an example. Other examples may differ from what is described with respect to FIG. 3.

Regulatory or other guidelines may impose radiated energy limits, such as a maximum permissible exposure (MPE) limit for devices that transmit wireless signals, such as UEs. For example, a UE may be associated with a threshold that defines a limit for the strength of a radio frequency (RF) field or radiation toward a user. When a UE is subject to an MPE condition (which may, for example, be a threshold that provides for adherence to an MPE limit of the UE), a downlink beam may be suitable for use by the UE to communicate with a base station, but a corresponding uplink beam in the same reciprocal beam pair may not be permitted for use, due to the uplink beam satisfying the MPE condition. In such a case, the UE may move to an updated uplink beam, that does not satisfy the MPE condition, to continue communication with the base station.

A base station may not know which UE beams create an MPE condition at the UE. Therefore, it may be difficult for the base station to configure a set of transmit beams for the UE that do not violate MPE requirements. Furthermore, a beam transmitted at a lower power level or less frequently may not satisfy an MPE condition, but the beam may satisfy the MPE condition when transmitted at a higher power level or more frequently. Thus, a binary approach, in which a beam is deactivated entirely due to an MPE condition, may be inefficient and may leave room for further improvement of beam management within MPE restrictions.

Some techniques and apparatuses described herein provide duty cycle signaling for one or more transmit beams of a UE. For example, a UE may determine that an MPE condition is satisfied for a beam or a set of beams, and may determine a duty cycle for the beam or the set of beams that reduces an exposure value such that the MPE condition is no longer satisfied for the beam or the set of beams. In some aspects, the UE may signal information associated with one or more transmit beams in addition to a duty cycle value, such as a maximum power reduction value, a maximum output power value, a power headroom value, and/or the like. The UE may perform this signaling for a single beam or a group of beams. In this way, the radiated energy of a transmit beam may be reduced to conform with MPE restrictions, thereby enabling the continued use of the transmit beam. This, in turn, improves utilization of transmission resources of the UE and reduces transmission exposure of users of the UE.

Figure 4:
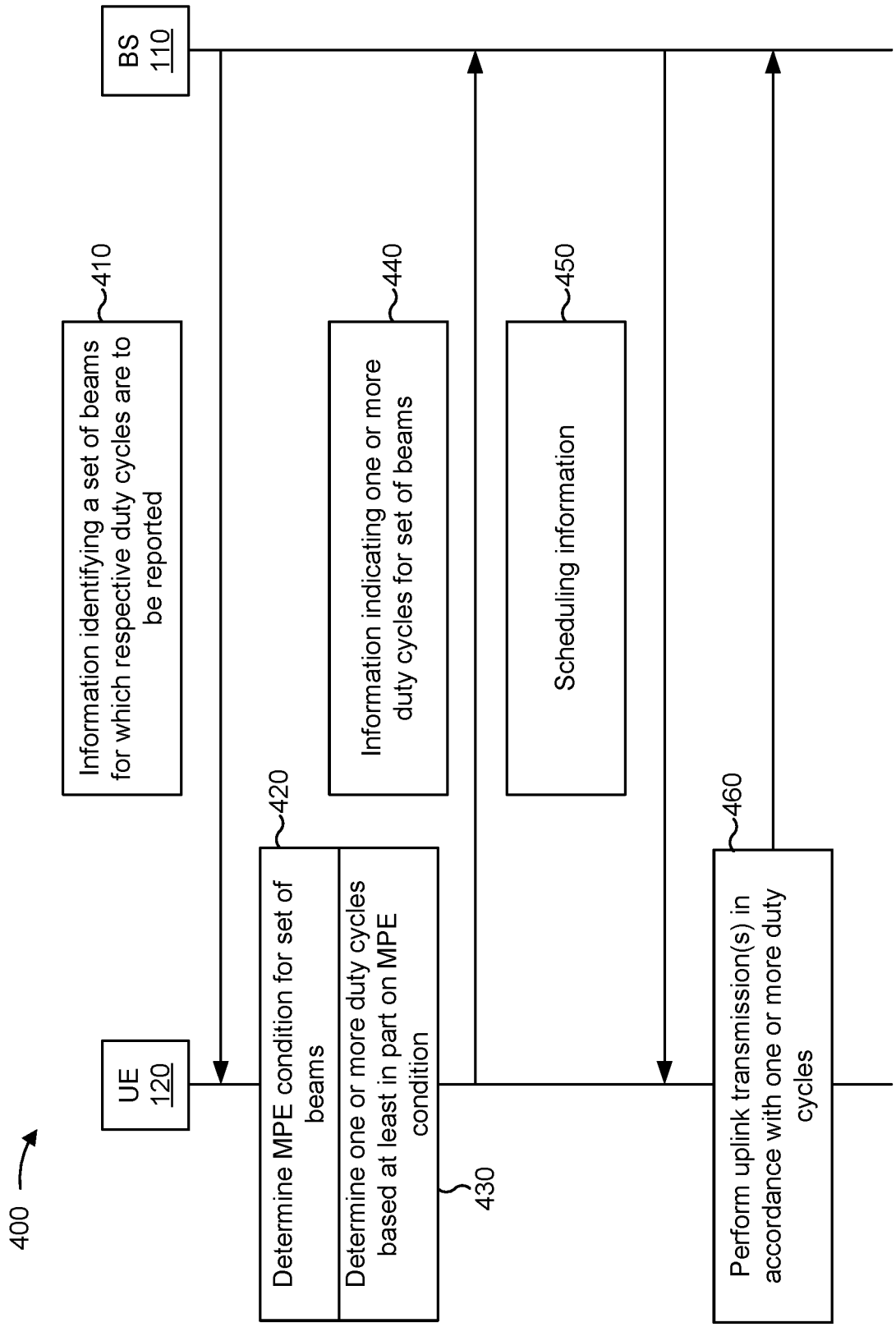
FIG. 4 is a diagram of an example of signaling associated with reporting a per-beam duty cycle, in accordance with various aspects of the present disclosure.

FIG. 4 is a diagram of an example 400 of signaling associated with reporting a per-beam duty cycle, in accordance with various aspects of the present disclosure. As shown, example 400 includes a UE 120 and a BS 110.

As shown by reference number 410, in some aspects, the BS 110 may transmit, to the UE 120, information identifying a set of beams for which respective duty cycles are to be reported. In some aspects, the UE 120 may be configured (e.g., radio resource control (RRC) configured and/or the like) with a set of beams for which duty cycles are to be reported. This set of beams may be referred to herein as q0. In some aspects, the information shown by reference number 410 may explicitly identify the set of beams. For example, the information may indicate an uplink beam identifier (ID) (e.g., a sounding reference signal resource indicator (SRI) for the physical uplink shared channel (PUSCH), a physical uplink control channel (PUCCH) spatial relation ID, or a sounding reference signal (SRS) spatial relation reference signal (RS)), a spatial RS ID (e.g., a channel state information reference signal (CSI-RS) resource ID or a synchronization signal block (SSB) ID), an uplink resource ID (e.g., a PUCCH/SRS resource ID or an SRS resource set ID), and/or the like. In some aspects, the information shown by reference number 410 may implicitly identify the set of beams.

As shown by reference number 420, the UE 120 may determine an MPE condition. The MPE condition may relate to one or more transmit beams generated by the UE 120. For example, the UE 120 may determine a threshold associated with the MPE condition. The threshold may relate to, for example, a total radiated power, a maximum output power, an effective isotropic radiated power (EIRP), a radiated power on a single beam, a radiated power on a beam directed toward a user of the UE 120, and/or the like. If the threshold is satisfied (e.g., for a given time window) with regard to a beam, then the beam may exceed the MPE limit.

As shown by reference number 430, the UE 120 may determine one or more duty cycles based at least in part on the MPE condition. A duty cycle value may identify a threshold for transmissions on a corresponding beam. For example, a duty cycle value of 60% may indicate that the corresponding beam can transmit no more than 60% of the time. As another example, a duty cycle value of 60% may indicate that, if the duty cycle value is exceeded for a beam (e.g., if the beam is used to transmit more than 60% of the time), then the UE 120 can apply a maximum output power reduction to the beam. In some aspects, the UE 120 may determine a maximum output power reduction value based at least in part on the MPE condition. In some aspects, the UE 120 may determine the one or more duty cycles and/or the maximum output power reduction value based at least in part on a configured UE maximum output power. For example, the UE 120 may determine the one or more duty cycles and/or the maximum output power reduction value such that a corresponding measured peak EIRP of the UE 120 is within bounds based at least in part on a power class of the UE 120 and/or one or more other parameters.

As shown by reference number 440, the UE 120 may transmit information indicating the one or more duty cycles. Additionally, or alternatively, the UE 120 may transmit information indicating the maximum output power reduction value. FIGS. 5-8 are diagrams illustrating example messaging structures 500, 600, 700, and 800 for beam-specific duty cycle reporting, in accordance with various aspects of the present disclosure. In example messaging structures 500, 600, 700, and 800, "R" indicates a field for one or more reserved bits. The UE may transmit information indicating one or more duty cycle values (e.g., maxUplinkDutyCycle) for one or more transmit beams. For example, the information indicating the one or more duty cycle values may be provided in a medium access control (MAC) control element (CE), an uplink beam report (e.g., a physical layer uplink beam report), capability information, or the like. In another example, the information indicating the one or more duty cycle values can be reported as uplink control information, such as on a PUCCH. In some aspects, the information indicating the one or more duty cycle values may be reported periodically, for example, based at least in part on a periodicity. In some aspects, the information indicating the one or more duty cycle values may be reported semi-persistently with reporting activation and deactivation. In some aspects, the information indicating the one or more duty cycle values may be reported aperiodically with a trigger in downlink control information (DCI). In some aspects, the information indicating the one or more duty cycle values may be reported based at least in part on an event. For example, the reporting may be event driven based in a higher layer of the UE 120.

"Information indicating a duty cycle" is used interchangeably with "information indicating a duty cycle value" herein. In other words, a reference to providing information indicating a duty cycle should be understood to include providing information indicating a duty cycle value.

Figure 5:
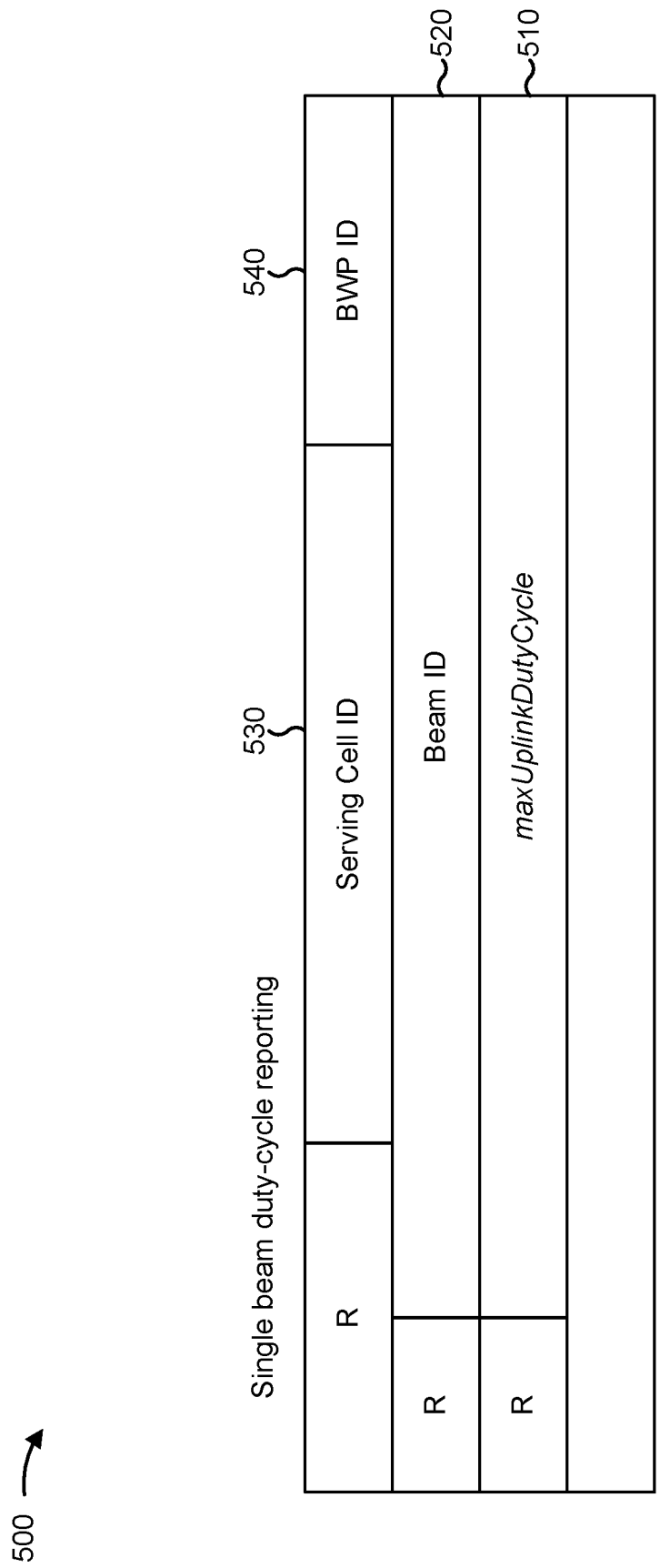
FIGS. 5-8 are diagrams illustrating example messaging structures for beam-specific duty cycle reporting, in accordance with various aspects of the present disclosure.

FIG. 5 is a diagram illustrating an example of a per-beam duty cycle report, in accordance with the present disclosure. For example, the information indicating the one or more duty cycle values may indicate a per-beam duty cycle report.

As shown by reference number 510, the per-beam duty cycle report may indicate a duty cycle, such as via a parameter maxUplinkDutyCycle. As shown by reference number 520, the information indicating the one or more duty cycle values may identify a corresponding transmit beam. For example, the information may indicate an uplink beam ID (e.g., an SRI for the PUSCH, a PUCCH spatial relation ID, or an SRS spatial relation RS), a spatial RS ID (e.g., a CSI-RS resource ID or an SSB ID), an uplink resource ID (e.g., a PUCCH/SRS resource ID or an SRS resource set ID), and/or the like. In some aspects, example messaging structure 500 may include information indicating a serving cell associated with the duty cycle (e.g., a serving cell identifier, shown by reference number 530), information indicating a bandwidth part associated with the duty cycle (e.g., a bandwidth part identifier, shown by reference number 540), or the like. Per-beam duty cycle reporting may provide overhead reduction relative to multi-beam duty cycle reporting if a relatively small number of duty cycles are to be reported.

Figure 6:
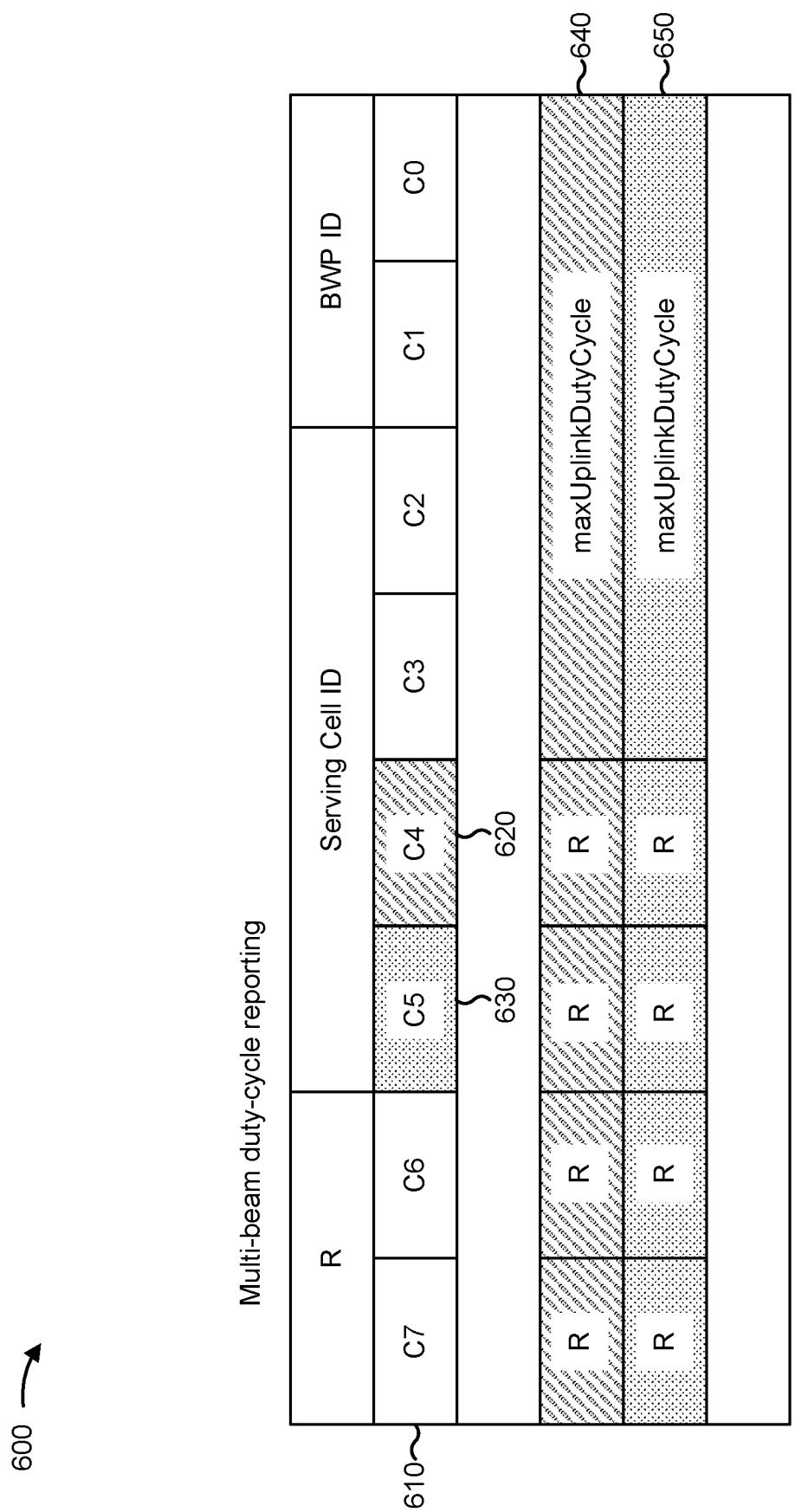

FIG. 6 shows an example messaging structure 600 for multi-beam duty cycle reporting, in accordance with the present disclosure. As shown by reference number 610, the message may indicate beams, from a set of transmit beams C0 through C7, to which the message relates. The set of transmit beams can be reported with a bitmap, and each bit can correspond to one transmit beam. The bitmap may be configured via RRC signaling, MAC signaling, DCI, or the like, such that each beam of the set of transmit beams C0 through C7 is mapped to a respective bit. When a bit is set to a first value (e.g., 1), the bit may indicate that a message related to the corresponding transmit beam is reported. When a bit is set to a second value (e.g., 0), the bit may indicate that the message related to the corresponding transmit beam is not reported. Here, the beams are C4 (shown by reference number 620) and C5 (shown by reference number 630), with the bits in corresponding positions in the bitmap set to the first value, as indicated by the respective hatched and dotted fill of the corresponding positions in the bitmap. As shown, the message includes respective duty cycle values for the beams. For example, as shown by reference number 640, a first duty cycle for C4 may be indicated in a first position (e.g., based at least in part on C4 being an earliest transmit beam index associated with a bit having a first value), and as shown by reference number 650, a second duty cycle for C5 may be in a second position. As further shown, each of the duty cycles may be associated with one or more reserved bits, which may be used to indicate other information associated with transmit beams C4 and C5. In another example, one or more beam identifiers for the set of transmit beams for which respective duty cycle values are reported, may be explicitly indicated in the reporting. In some aspects, the example messaging structure 600 may indicate a serving cell identifier associated with the duty cycle reporting, a bandwidth part identifier associated with the duty cycle reporting, or the like.

Figure 7:
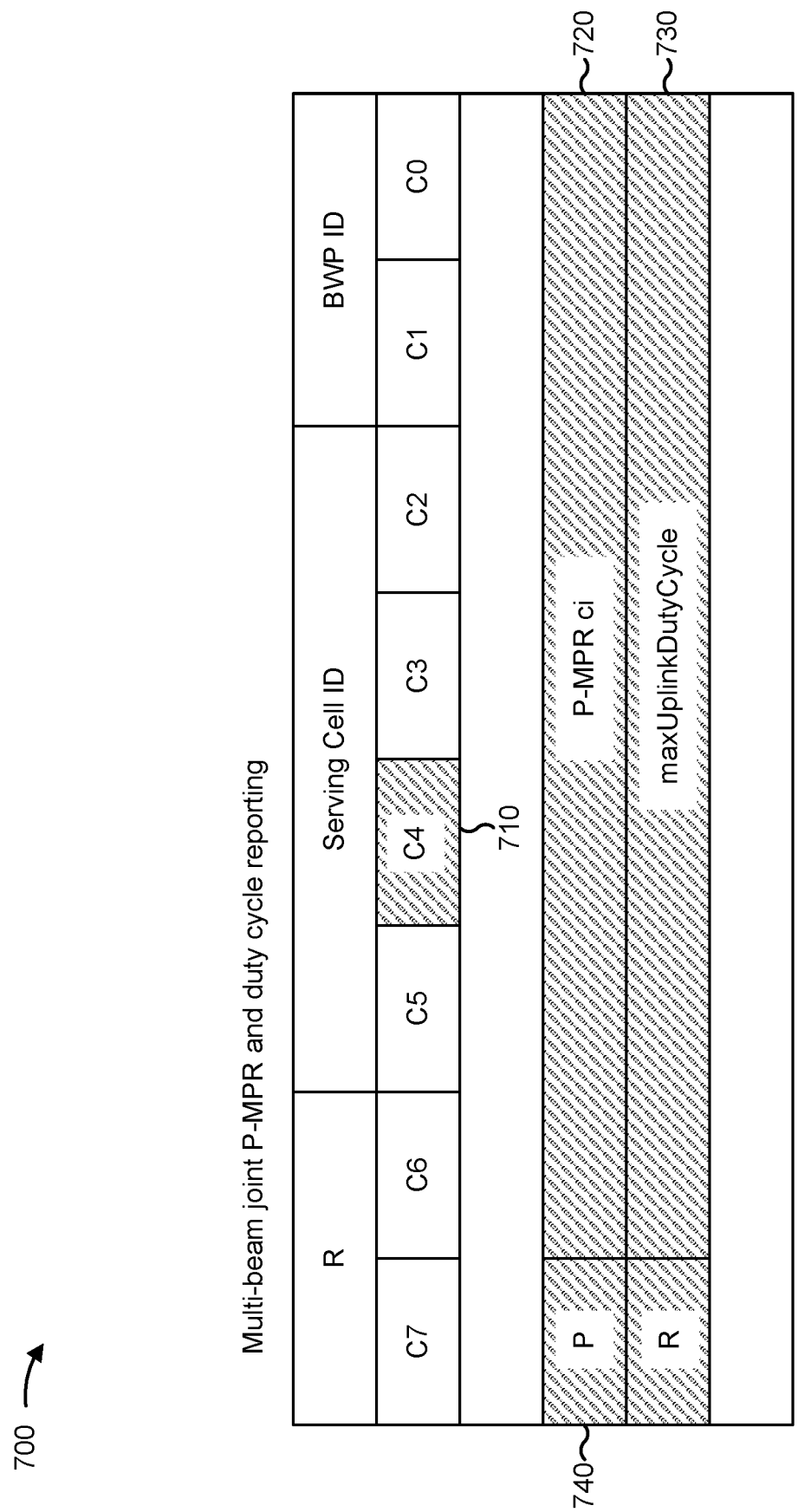

FIG. 7 shows an example messaging structure 700 for reporting a maximum output power reduction (sometimes referred to as a power management maximum power reduction, and abbreviated P-MPR) for a beam $c_i$, in accordance with the present disclosure. In FIG. 7, the P-MPR relates to a transmit beam C4, as indicated by a bit of a bitmap in a position corresponding to transmit beam C4, shown by reference number 710. The P-MPR corresponding to transmit beam C4 is shown by reference number 720, and a duty cycle corresponding to transmit beam C4 is shown by reference number 730. The maximum output power reduction may enable the UE 120 to reduce the output power of the beam so that the beam does not violate an MPE requirement. For example, a larger maximum output power reduction value may more significantly diminish the transmit power of a beam than a smaller maximum output power reduction, so that the radiative energy of the beam is less likely to violate an MPE requirement. As another example, the combination of a P-MPR value and a duty cycle value may reduce a beam's transmit power sufficiently as to not violate an MPE requirement. For example, if the duty cycle value is exceeded for the beam, the UE 120 may apply the P-MPR value to reduce the beam's transmit power sufficiently as to not violate the MPE condition. In FIG. 7, a field P, shown by reference number 740, indicates whether the duty cycle value is reported for the corresponding beam. For example, a first value of the field P may indicate that a duty cycle value (shown by reference number 730) is reported for the corresponding beam, whereas a second value of the field P may indicate that a duty cycle value is not reported for the corresponding beam. In some aspects, the example messaging structure 700 may indicate a serving cell identifier associated with the duty cycle reporting, a bandwidth part identifier associated with the duty cycle reporting, or the like.

Figure 8:
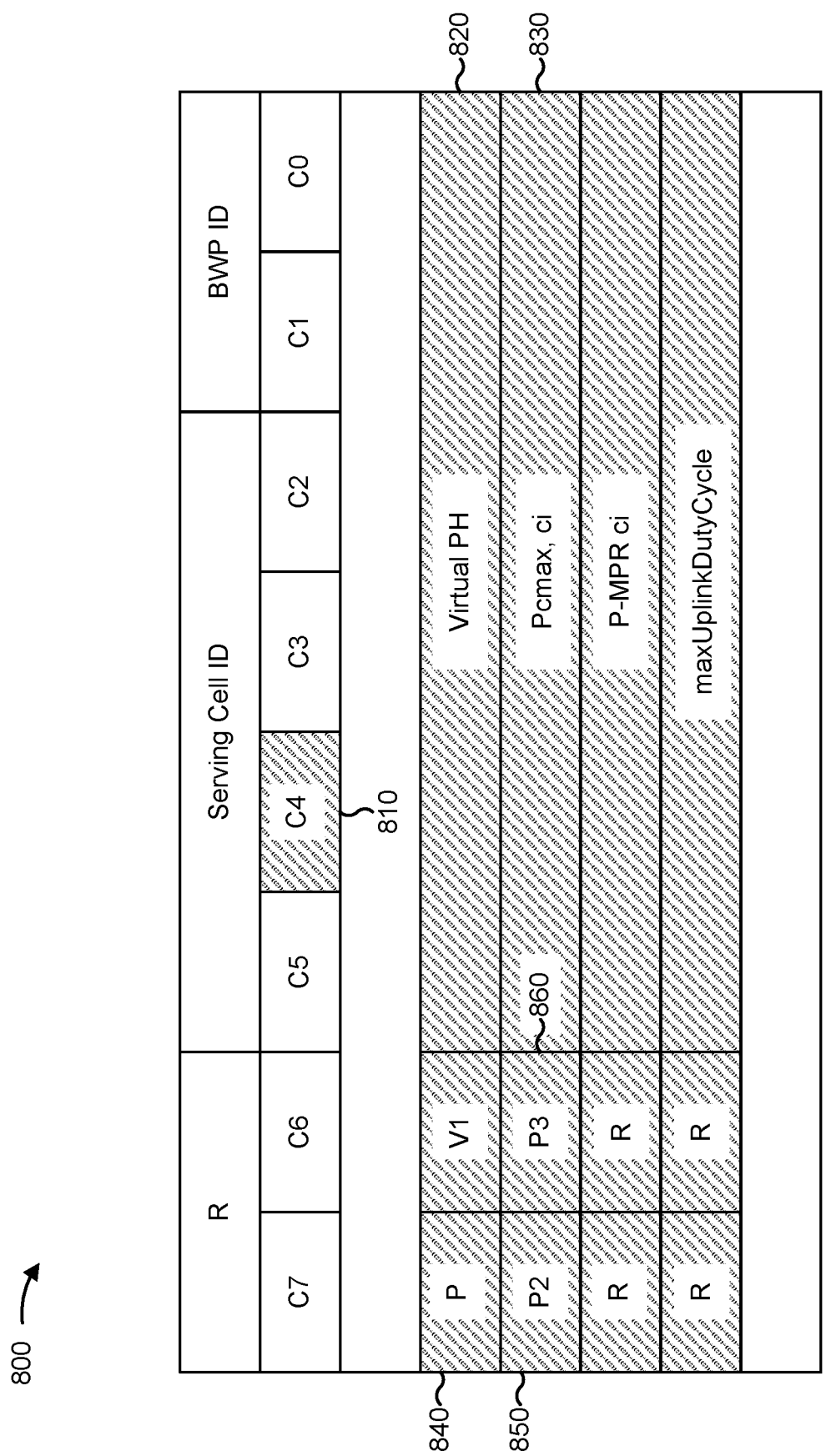

FIG. 8 is a diagram illustrating an example messaging structure 800 for indicating a power headroom and/or a maximum output power, in accordance with the present disclosure. FIG. 8 relates to a transmit beam C4, shown by reference number 810 and indicated by a bit in a bitmap corresponding to the transmit beam C4. As shown by reference number 820, the example messaging structure 800 may indicate a power headroom (PH) for a beam $c_i$. In FIG. 8, the beam $c_i$ is transmit beam C4. The PH can be a virtual PH based on a reference transmission of the resource related with the beam reported (as shown in FIG. 8), or a true PH based on a real transmission of the resource related with the beam reported (not shown in FIG. 8). As shown, the PH may be associated with a field V1, which may be set to a first value when the PH is a virtual PH and a second value when the PH is a true PH. As shown by reference number 830, the example messaging structure 800 may indicate a maximum output power Pcmax, ci for a beam ci. Pcmax may indicate a UE-determined maximum output power for a given beam, carrier, serving cell, bandwidth part, or the like. In FIG. 8, a field P (shown by reference number 840) indicates whether Pcmax, ci is reported or not with P-MPR ci>0, a field P2 (shown by reference number 850), indicates whether P-MPR ci is reported, and a field P3 (shown by reference number 860), indicates whether maxUplinkDutyCycle is reported. P-MPR ci and maxUplinkDutyCycle are described in more detail in connection with FIG. 7. Example messaging structure 800 may enable the signaling of a variety of parameters associated with a beam in a single message, which reduces latency associated with the signaling of the variety of parameters. In some aspects, the example messaging structure 800 may include a serving cell identifier, a bandwidth part identifier, or the like.

Returning to FIG. 4, the BS 110 may communicate with the UE 120 based at least in part on the information indicating the one or more duty cycles for the set of beams. For example, as shown by reference number 450, the BS 110 may transmit scheduling information to the UE 120 scheduling one or more uplink transmissions for the UE 120. In some aspects, the scheduling information may conform with the information indicating the one or more duty cycles. For example, the scheduling information may schedule the UE 120 to perform one or more uplink transmissions that do not exceed the one or more duty cycles for a corresponding beam. In other aspects, the scheduling information may not conform with the information indicating the one or more duty cycles. For example, the BS 110 may not take the one or more duty cycles into account for the scheduling information, may disregard the one or more duty cycles, or the like.

As shown by reference number 460, the UE 120 may perform one or more uplink transmissions in accordance with the one or more duty cycles. For example, the one or more uplink transmissions may be on the set of beams and may not exceed the one or more duty cycles. As another example, if the one or more uplink transmissions are scheduled to exceed the one or more duty cycles, the UE 120 may apply a maximum output power reduction value to the one or more uplink transmissions. In this way, the radiated energy of a transmit beam may be reduced to conform with MPE restrictions, thereby enabling the continued use of the transmit beam. This, in turn, improves utilization of transmission resources of the UE 120 and reduces radiation exposure of users of the UE 120.

As indicated above, FIGS. 4-8 are provided as one or more examples. Other examples may differ from what is described with respect to FIGS. 4-8.

Figure 9:
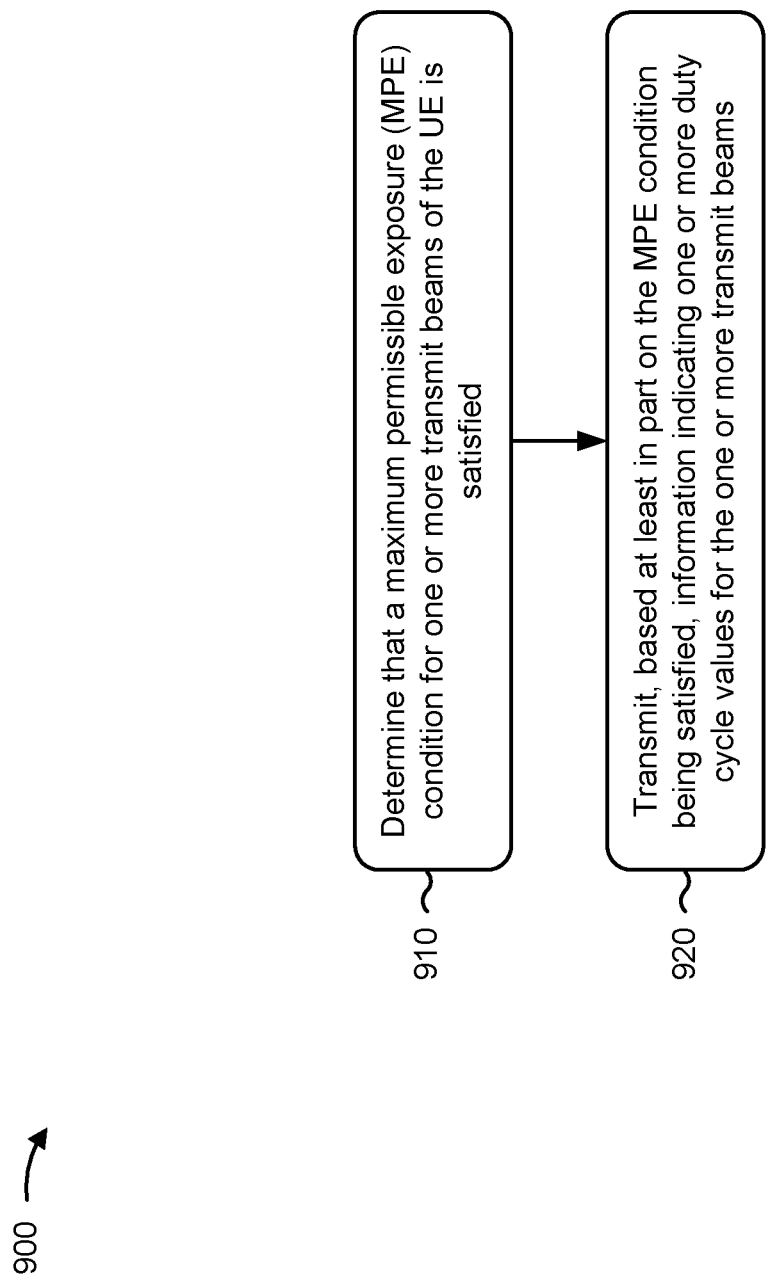
FIG. 9 is a diagram illustrating an example process performed, for example, by a user equipment, in accordance with various aspects of the present disclosure.

FIG. 9 is a diagram illustrating an example process 900 performed, for example, by a UE, in accordance with various aspects of the present disclosure. Example process 900 is an example where the UE (e.g., UE 120 and/or the like) performs operations associated with beam-specific duty cycle.

As shown in FIG. 9, in some aspects, process 900 may include determining an MPE condition for one or more transmit beams of the UE (block 910). For example, the UE (e.g., using controller/processor 280, transmit processor 264, TX MIMO processor 266, MOD 254, antenna 252, and/or the like) may determine an MPE condition for one or more transmit beams of the UE, as described above.

As further shown in FIG. 9, in some aspects, process 900 may include transmitting, to a base station based at least in part on the MPE condition being satisfied, information indicating one or more duty cycle values for the one or more transmit beams (block 920). For example, the UE (e.g., using controller/processor 280, transmit processor 264, TX MIMO processor 266, MOD 254, antenna 252, and/or the like) may transmit, to a base station based at least in part on the MPE condition, information indicating one or more duty cycle values for the one or more transmit beams, as described above.

Process 900 may include additional aspects, such as any single aspect or any combination of aspects described below and/or in connection with one or more other processes described elsewhere herein.

In a first aspect, the information indicating the one or more duty cycle values is transmitted in a medium access control control element.

In a second aspect, alone or in combination with the first aspect, the information indicating the one or more duty cycle values is transmitted in an uplink beam report.

In a third aspect, alone or in combination with one or more of the first and second aspects, the information indicating the one or more duty cycle values identifies the one or more transmit beams based at least in part on one or more uplink beam identifiers.

In a fourth aspect, alone or in combination with one or more of the first through third aspects, the information indicating the one or more duty cycle values identifies the one or more transmit beams based at least in part on one or more spatial reference signal identifiers.

In a fifth aspect, alone or in combination with one or more of the first through fourth aspects, the information indicating the one or more duty cycle values identifies the one or more transmit beams based at least in part on one or more uplink resource identifiers.

In a sixth aspect, alone or in combination with one or more of the first through fifth aspects, process 900 includes receiving radio resource control information identifying a set of beams for which respective duty cycles are to be reported, wherein the one or more transmit beams are included in the set of beams.

In a seventh aspect, alone or in combination with one or more of the first through sixth aspects, the information indicating the one or more duty cycle values is provided with information indicating the one or more transmit beams, of a plurality of transmit beams, for which the information indicating the one or more duty cycles is provided.

In an eighth aspect, alone or in combination with one or more of the first through seventh aspects, process 900 includes providing, with the information indicating the one or more duty cycle values, information indicating one or more maximum output power reduction values for the one or more transmit beams.

In a ninth aspect, alone or in combination with one or more of the first through eighth aspects, process 900 includes providing, with the information indicating the one or more duty cycle values, information indicating one or more maximum output power values for the one or more transmit beams.

In a tenth aspect, alone or in combination with one or more of the first through ninth aspects, process 900 includes providing, with the information indicating the one or more duty cycle values, information indicating one or more power headroom values for the one or more transmit beams.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
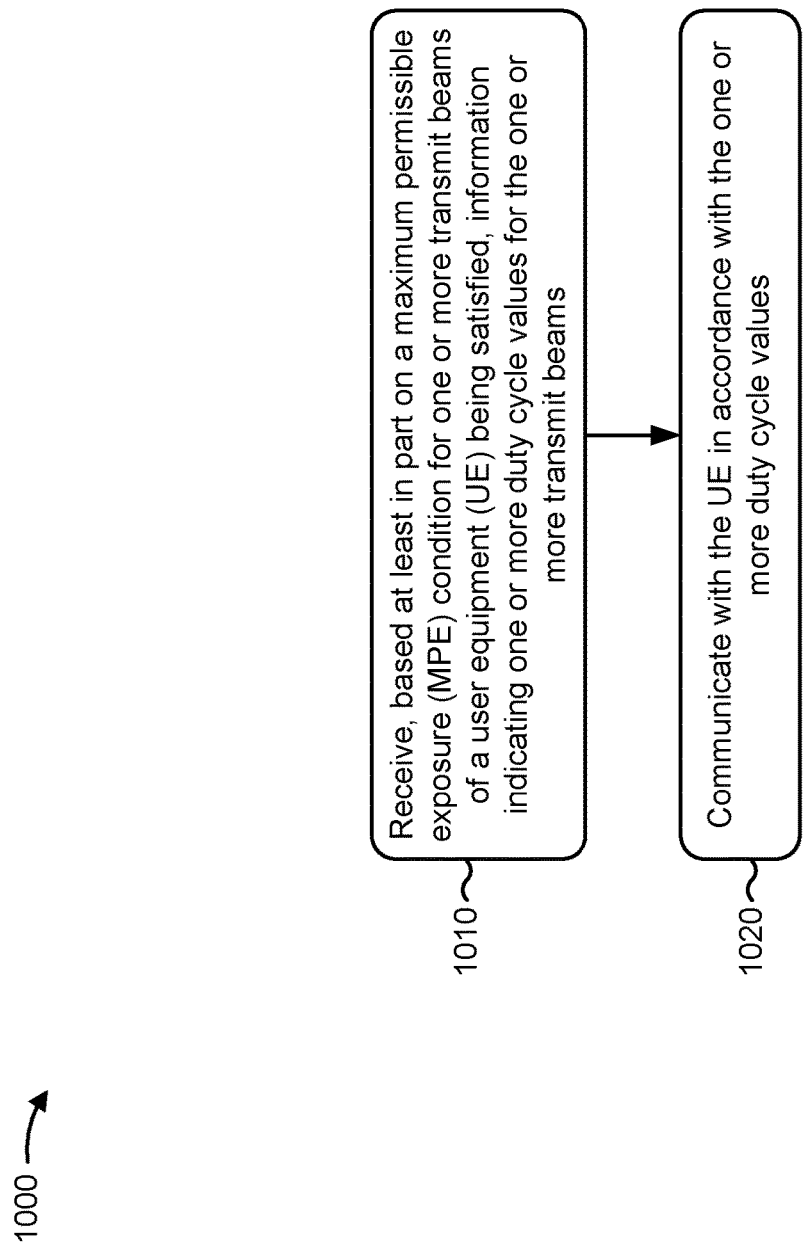
FIG. 10 is a diagram illustrating an example process performed, for example, by a base station, in accordance with various aspects of the present disclosure.

FIG. 10 is a diagram illustrating an example process 1000 performed, for example, by a base station, in accordance with various aspects of the present disclosure. Example process 1000 is an example where the base station (e.g., base station 110 and/or the like) performs operations associated with a beam-specific duty cycle.

As shown in FIG. 10, in some aspects, process 1000 may include receiving, based at least in part on an MPE condition for one or more transmit beams of a UE being satisfied, information indicating one or more duty cycle values for the one or more transmit beams (block 1010). For example, the base station (e.g., using antenna 234, DEMOD 232, MIMO detector 236, receive processor 238, controller/processor 240, and/or the like) may receive, based at least in part on an MPE condition for one or more transmit beams of a UE being satisfied, information indicating one or more duty cycle values for the one or more transmit beams, as described above.

As further shown in FIG. 10, in some aspects, process 1000 may include communicating with the UE in accordance with the one or more duty cycle values (block 1020). For example, the base station (e.g., using controller/processor 240, transmit processor 220, TX MIMO processor 230, MOD 232, antenna 234, and/or the like) may communicate with the UE in accordance with the one or more duty cycle values, as described above.

Process 1000 may include additional aspects, such as any single aspect or any combination of aspects described below and/or in connection with one or more other processes described elsewhere herein.

In a first aspect, the information indicating the one or more duty cycle values is received in a medium access control control element.

In a second aspect, alone or in combination with the first aspect, the information indicating the one or more duty cycle values is received in an uplink beam report.

In a third aspect, alone or in combination with one or more of the first and second aspects, the information indicating the one or more duty cycle values identifies the one or more transmit beams based at least in part on one or more uplink beam identifiers.

In a fourth aspect, alone or in combination with one or more of the first through third aspects, the information indicating the one or more duty cycle values identifies the one or more transmit beams based at least in part on one or more spatial reference signal identifiers.

In a fifth aspect, alone or in combination with one or more of the first through fourth aspects, the information indicating the one or more duty cycle values identifies the one or more transmit beams based at least in part on one or more uplink resource identifiers.

In a sixth aspect, alone or in combination with one or more of the first through fifth aspects, process 1000 includes transmitting radio resource control information identifying a set of beams for which respective duty cycles are to be reported, wherein the one or more is beaming are included in the set of beams.

In a seventh aspect, alone or in combination with one or more of the first through sixth aspects, the information indicating the one or more duty cycle values is received with information indicating the one or more transmit beams, of a plurality of transmit beams, for which the information indicating the one or more duty cycles is provided.

In an eighth aspect, alone or in combination with one or more of the first through seventh aspects, process 1000 includes receiving, with the information indicating the one or more duty cycle values, information indicating one or more maximum output power reduction values for the one or more transmit beams.

In a ninth aspect, alone or in combination with one or more of the first through eighth aspects, process 1000 includes receiving, with the information indicating the one or more duty cycle values, information indicating one or more maximum output power values for the one or more transmit beams.

In a tenth aspect, alone or in combination with one or more of the first through ninth aspects, process 1000 includes receiving, with the information indicating the one or more duty cycle values, information indicating one or more power headroom values for the one or more transmit beams.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
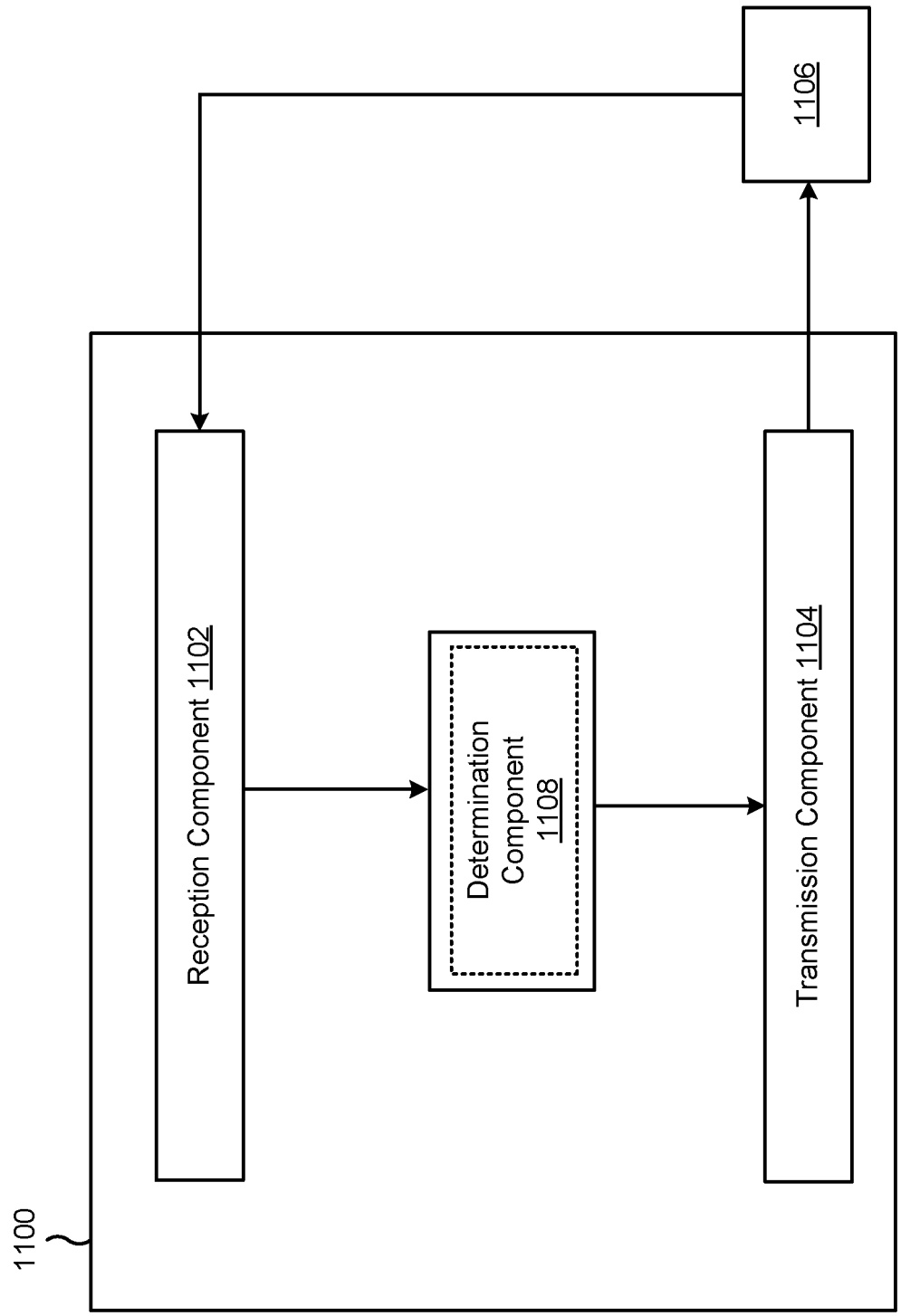
FIG. 11 is a block diagram of an example apparatus for wireless communication, in accordance with various aspects of the present disclosure.

FIG. 11 is a block diagram of an example apparatus 1100 for wireless communication, in accordance with various aspects of the present disclosure. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a determination component 1108, among other examples.

In some aspects, the apparatus 1100 may be configured to perform one or more operations described herein in connection with FIGS. 4-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE described above in connection with FIG. 2. In some aspects, the transmission component 1104 may be co-located with the reception component 1102 in a transceiver.

The determination component 1108 may determine an MPE condition for one or more transmit beams of the UE. The transmission component 1104 may transmit, to a base station based at least in part on the MPE condition, information indicating one or more duty cycle values for the one or more transmit beams. The reception component 1102 may receive radio resource control information identifying a set of beams for which respective duty cycles are to be reported, wherein the one or more transmit beams are included in the set of beams.

The transmission component 1104 may provide, with the information indicating the one or more duty cycle values, information indicating one or more maximum output power reduction values for the one or more transmit beams.

The transmission component 1104 may provide, with the information indicating the one or more duty cycle values, information indicating one or more maximum output power values for the one or more transmit beams.

The transmission component 1104 may provide, with the information indicating the one or more duty cycle values, information indicating one or more power headroom values for the one or more transmit beams.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
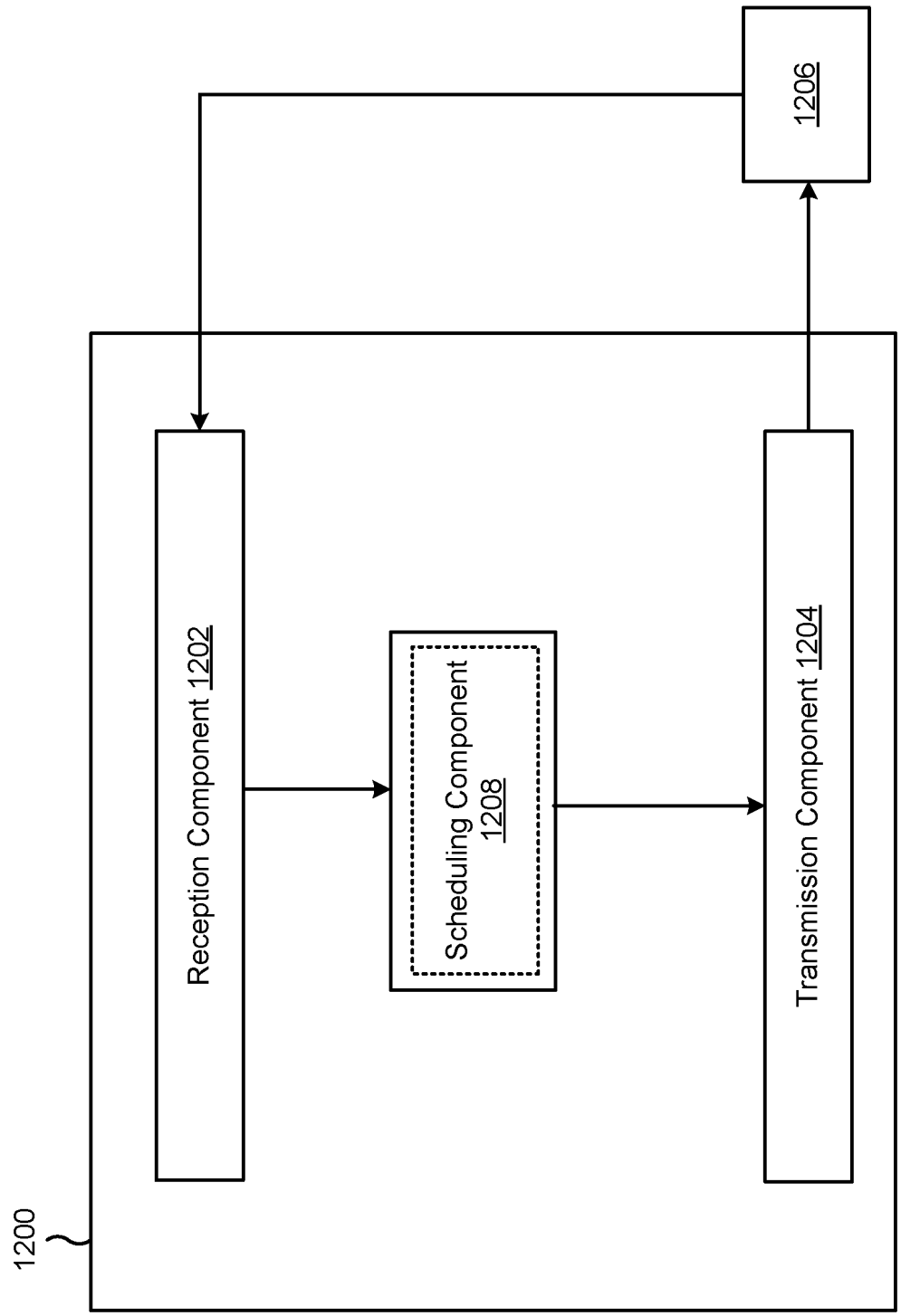
FIG. 12 is a block diagram of an example apparatus for wireless communication, in accordance with various aspects of the present disclosure.

FIG. 12 is a block diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a scheduling component 1208, among other examples.

In some aspects, the apparatus 1200 may be configured to perform one or more operations described herein in connection with FIGS. 4-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The reception component 1202 may receive, based at least in part on an MPE condition for one or more transmit beams of a UE, information indicating one or more duty cycle values for the one or more transmit beams. The scheduling component 1208 may communicate with the UE in accordance with the one or more duty cycle values.

The transmission component 1204 may transmit radio resource control information identifying a set of beams for which respective duty cycles are to be reported, wherein the one or more transmit beams are included in the set of beams.

The reception component 1202 may receive, with the information indicating the one or more duty cycle values, information indicating one or more maximum output power reduction values for the one or more transmit beams.

The reception component 1202 may receive, with the information indicating the one or more duty cycle values, information indicating one or more maximum output power values for the one or more transmit beams.

The reception component 1202 may receive, with the information indicating the one or more duty cycle values, information indicating one or more power headroom values for the one or more transmit beams.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some aspects of the present disclosure:

Aspect 1: A method of wireless communication performed by a user equipment (UE), comprising: determining a maximum permissible exposure (MPE) condition for one or more transmit beams of the UE; and transmitting, to a base station based at least in part on the MPE condition, information indicating one or more duty cycle values for the one or more transmit beams.

Aspect 2: The method of aspect 1, wherein the information indicating the one or more duty cycle values is transmitted in a medium access control control element.

Aspect 3: The method of any of aspects 1-2, wherein the information indicating the one or more duty cycle values is transmitted in an uplink beam report.

Aspect 4: The method of any of aspects 1-3, wherein the information indicating the one or more duty cycle values identifies the one or more transmit beams based at least in part on one or more uplink beam identifiers.

Aspect 5: The method of any of aspects 1-4, wherein the information indicating the one or more duty cycle values identifies the one or more transmit beams based at least in part on one or more spatial reference signal identifiers.

Aspect 6: The method of any of aspects 1-5, wherein the information indicating the one or more duty cycle values identifies the one or more transmit beams based at least in part on one or more uplink resource identifiers.

Aspect 7: The method of ay of aspects 1-6, further comprising: receiving radio resource control information identifying a set of beams for which respective duty cycles are to be reported, wherein the one or more transmit beams are included in the set of beams.

Aspect 8: The method of any of aspects 1-7, wherein the information indicating the one or more duty cycle values is provided with information indicating the one or more transmit beams, of a plurality of transmit beams, for which the information indicating the one or more duty cycles is provided.

Aspect 9: The method of any of aspects 1-8, further comprising: providing, with the information indicating the one or more duty cycle values, information indicating one or more maximum output power reduction values for the one or more transmit beams.

Aspect 10: The method of any of aspects 1-9, further comprising: providing, with the information indicating the one or more duty cycle values, information indicating one or more maximum output power values for the one or more transmit beams.

Aspect 11: The method of any of aspects 1-10, further comprising: providing, with the information indicating the one or more duty cycle values, information indicating one or more power headroom values for the one or more transmit beams.

Aspect 12: A method of wireless communication performed by a base station, comprising: receiving, based at least in part on a maximum permissible exposure (MPE) condition for one or more transmit beams of a user equipment (UE), information indicating one or more duty cycle values for the one or more transmit beams; and communicating with the UE in accordance with the one or more duty cycle values.

Aspect 13: The method of aspect 12, wherein the information indicating the one or more duty cycle values is received in a medium access control control element.

Aspect 14: The method of any of aspects 12-13, wherein the information indicating the one or more duty cycle values is received in an uplink beam report.

Aspect 15: The method of any of aspects 12-14, wherein the information indicating the one or more duty cycle values identifies the one or more transmit beams based at least in part on one or more uplink beam identifiers.

Aspect 16: The method of any of aspects 12-15, wherein the information indicating the one or more duty cycle values identifies the one or more transmit beams based at least in part on one or more spatial reference signal identifiers.

Aspect 17: The method of any of aspects 12-16, wherein the information indicating the one or more duty cycle values identifies the one or more transmit beams based at least in part on one or more uplink resource identifiers.

Aspect 18: The method of any of aspects 12-17, further comprising: transmitting radio resource control information identifying a set of beams for which respective duty cycles are to be reported, wherein the one or more transmit beams are included in the set of beams.

Aspect 19: The method of any of aspects 12-18, wherein the information indicating the one or more duty cycle values is received with information indicating the one or more transmit beams, of a plurality of transmit beams, for which the information indicating the one or more duty cycles is provided.

Aspect 20: The method of any of aspects 12-19, further comprising: receiving, with the information indicating the one or more duty cycle values, information indicating one or more maximum output power reduction values for the one or more transmit beams.

Aspect 21: The method of any of aspects 12-20, further comprising: receiving, with the information indicating the one or more duty cycle values, information indicating one or more maximum output power values for the one or more transmit beams.

Aspect 22: The method of any of aspects 12-21, further comprising: receiving, with the information indicating the one or more duty cycle values, information indicating one or more power headroom values for the one or more transmit beams.

Aspect 23: An apparatus for wireless communication at a device, comprising a processor; memory coupled with the processor; and instructions stored in the memory and executable by the processor to cause the apparatus to perform the method of one or more aspects of aspects 1-22.

Aspect 24: A device for wireless communication, comprising a memory and one or more processors coupled to the memory, the memory and the one or more processors configured to perform the method of one or more aspects of aspects 1-22.

Aspect 25: An apparatus for wireless communication, comprising at least one means for performing the method of one or more aspects of aspects 1-22.

Aspect 26: A non-transitory computer-readable medium storing code for wireless communication, the code comprising instructions executable by a processor to perform the method of one or more aspects of aspects 1-22.

Aspect 27: A non-transitory computer-readable medium storing a set of instructions for wireless communication, the set of instructions comprising one or more instructions that, when executed by one or more processors of a device, cause the device to perform the method of one or more aspects of aspects 1-22.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
   receiving, via radio resource control signaling, information identifying a plurality of transmit beams of the UE, the plurality of transmit beams corresponding to beams with one or more duty cycle values to be reported;
   determining a maximum permissible exposure (MPE) condition for the plurality of transmit beams; and
   transmitting, to a network entity based at least in part on the MPE condition, information indicating the one or more duty cycle values, the one or more duty cycle values including at least one duty cycle value for each beam of the plurality of transmit beams, wherein the information indicating the one or more duty cycle values includes a bitmap identifying the plurality of transmit beams.

2. The method of claim 1, wherein the information indicating the one or more duty cycle values is transmitted in a medium access control control element.

3. The method of claim 1, wherein the information indicating the one or more duty cycle values is transmitted in an uplink beam report.

4. The method of claim 1, wherein the information indicating the one or more duty cycle values identifies the plurality of transmit beams based at least in part on a plurality of corresponding uplink beam identifiers.

5. The method of claim 1, wherein the information indicating the one or more duty cycle values identifies the plurality of transmit beams based at least in part on a plurality of corresponding spatial reference signal identifiers.

6. The method of claim 1, wherein the information indicating the one or more duty cycle values identifies the plurality of transmit beams based at least in part on a plurality of corresponding uplink resource identifiers.

7. The method of claim 1, further comprising:
   providing, with the information indicating the one or more duty cycle values, additional information indicating one or more maximum output power reduction values for at least one beam of the plurality of transmit beams.

8. The method of claim 1, further comprising:
providing, with the information indicating the one or more duty cycle values, additional information indicating one or more maximum output power values for at least one beam of the plurality of transmit beams.

9. The method of claim 1, further comprising:
providing, with the information indicating the one or more duty cycle values, additional information indicating one or more power headroom values for at least one beam of the plurality of transmit beams.

10. A method of wireless communication performed by a network entity, comprising:
transmitting, via radio resource control signaling, information identifying a plurality of transmit beams of a user equipment (UE), the plurality of transmit beams corresponding to beams with one or more duty cycle values to be reported;
receiving, based at least in part on a maximum permissible exposure (MPE) condition for the plurality of transmit beams, information indicating the one or more duty cycle values, the one or more duty cycle values including at least one duty cycle value for each beam of the plurality of transmit beams, wherein the information indicating the one or more duty cycle values includes a bitmap identifying the plurality of transmit beams; and
communicating with the UE in accordance with the one or more duty cycle values.

11. The method of claim 10, wherein the information indicating the one or more duty cycle values is received in a medium access control control element.

12. The method of claim 10, wherein the information indicating the one or more duty cycle values is received in an uplink beam report.

13. The method of claim 10, wherein the information indicating the one or more duty cycle values identifies the plurality of transmit beams based at least in part on a plurality of corresponding uplink beam identifiers.

14. The method of claim 10, wherein the information indicating the one or more duty cycle values identifies the plurality of transmit beams based at least in part on a plurality of corresponding spatial reference signal identifiers.

15. The method of claim 10, wherein the information indicating the one or more duty cycle values identifies the plurality of transmit beams based at least in part on a plurality of corresponding uplink resource identifiers.

16. The method of claim 10, further comprising:
receiving, with the information indicating the one or more duty cycle values, additional information indicating one or more maximum output power reduction values for at least one beam of the plurality of transmit beams.

17. The method of claim 10, further comprising:
receiving, with the information indicating the one or more duty cycle values, additional information indicating one or more maximum output power values for at least one beam of the plurality of transmit beams.

18. The method of claim 10, further comprising:
receiving, with the information indicating the one or more duty cycle values, additional information indicating one or more power headroom values for at least one beam of the plurality of transmit beams.

19. The method of claim 10, wherein the information indicating the one or more duty cycle values is reported periodically based at least in part on a periodicity.

20. A user equipment (UE) for wireless communication, comprising:
a memory; and
one or more processors coupled to the memory, the one or more processors configured to:
receive, via radio resource control signaling, information identifying a plurality of transmit beams of the UE, the plurality of transmit beams corresponding to beams with one or more duty cycle values to be reported;
determine a maximum permissible exposure (MPE) condition for the plurality of transmit beams; and
transmit, to a network entity based at least in part on the MPE condition, information indicating the one or more duty cycle values, the one or more duty cycle values including at least one duty cycle value for each beam of the plurality of transmit beams, wherein the information indicating the one or more duty cycle values includes a bitmap identifying the plurality of transmit beams.

21. The UE of claim 20, wherein the one or more processors are further configured to:
provide, with the information indicating the one or more duty cycle values, additional information indicating one or more maximum output power reduction values for at least one beam of the plurality of transmit beams.

22. The UE of claim 20, wherein the one or more processors are further configured to:
provide, with the information indicating the one or more duty cycle values, additional information indicating one or more maximum output power values for at least one beam of the plurality of transmit beams.

23. The UE of claim 20, wherein the one or more processors are further configured to:
provide, with the information indicating the one or more duty cycle values, additional information indicating one or more power headroom values for at least one beam of the plurality of transmit beams.

24. The UE of claim 20, wherein the information indicating the one or more duty cycle values is transmitted in at least one of: a medium access control control element, an uplink beam report, or capability information.

25. The UE of claim 20, wherein the radio resource control signaling configures the bitmap.

26. A network entity for wireless communication, comprising:
a memory; and
one or more processors coupled to the memory, the one or more processors configured to:
transmit, via radio resource control signaling, information identifying a plurality of transmit beams of a user equipment (UE), the plurality of transmit beams corresponding to beams with one or more duty cycle values to be reported;
receive, based at least in part on a maximum permissible exposure (MPE) condition for the plurality of transmit beams, information indicating the one or more duty cycle values, the one or more duty cycle values including at least one duty cycle value for each beam of the plurality of transmit beams, wherein the information indicating the one or more duty cycle values includes a bitmap identifying the plurality of transmit beams; and
communicate with the UE in accordance with the one or more duty cycle values.

27. The network entity of claim 26, wherein the one or more processors are further configured to:
  receive, with the information indicating the one or more duty cycle values, additional information indicating one or more maximum output power reduction values for at least one beam of the plurality of transmit beams.

28. The network entity of claim 26, wherein the information indicating the one or more duty cycle values is received in at least one of: a medium access control control element, an uplink beam report, or capability information.

29. The network entity of claim 26, wherein the information indicating the one or more duty cycle values is reported periodically based at least in part on a periodicity.

30. The network entity of claim 26, wherein the bitmap is configured via the radio resource control signaling, medium access control signaling, or downlink control information.

* * * * *